(12) United States Patent
Tuulos

(10) Patent No.: US 6,980,797 B1
(45) Date of Patent: Dec. 27, 2005

(54) IDENTIFYING AN OBJECT

(75) Inventor: Martti Tuulos, Tampere (FI)

(73) Assignee: Nokia Corporation, Espoo (FI)

( * ) Notice: Subject to any disclaimer, the term of this patent is extended or adjusted under 35 U.S.C. 154(b) by 358 days.

(21) Appl. No.: 10/018,572

(22) PCT Filed: Jun. 28, 2000

(86) PCT No.: PCT/FI00/00583

§ 371 (c)(1),
(2), (4) Date: Dec. 20, 2001

(87) PCT Pub. No.: WO01/02873

PCT Pub. Date: Jan. 11, 2001

(30) Foreign Application Priority Data

Jun. 30, 1999 (FI) ........................... 991494

(51) Int. Cl.⁷ ............................................. H04M 3/16

(52) U.S. Cl. .................. 455/411; 455/408; 455/435.1; 455/435.2; 455/41.2; 455/553.1; 455/557; 340/10.6; 340/10.42; 340/572.1; 340/505

(58) Field of Search ...................... 455/411, 408, 435.1, 455/435.2, 553.1, 552; 340/10.6, 10.42, 502.1, 340/505

(56) References Cited

U.S. PATENT DOCUMENTS 5,850,187 A 12/1998 Carrender et al.

FOREIGN PATENT DOCUMENTS

| EP | 645 728 | 3/1995 |
| WO | WO 97/20420 | 6/1997 |
| WO | WO 99/17230 | * 4/1999 |

OTHER PUBLICATIONS

Koelle, A., "Short Range UHF Telemetry Syustem Using Passive Transponders for Vehicle ID and Status Information," 1998 IEEE Workshop on Automitive Applications of ELecgronics, pp. 34-38.

Friedman, D. et al., "A Low-Power CMOS Integrated Circuit for Field-Powered Radio Frequency Identification Tags," Solid State Circuits Conference, 1997 Digest of Technical Papers, vol. Feb. 1997, (Yorktown Heights, NY), p. 294.

* cited by examiner

Primary Examiner—Joseph Feild
Assistant Examiner—David Q. Nguyen
(74) Attorney, Agent, or Firm—Pillsbury Winthrop Shaw Pittman LLP

(57) ABSTRACT

The present invention relates to a system including a mobile switching center, a base station communicating with the mobile switching center, a mobile station including a radio transmitter and a radio receiver for setting up a connection to the base station via the base station, an object including an identification mechanism, and a data processing device in which data relating to said object is maintained. For identifying the object, the mobile station reads the object's identification data from the identification mechanism, and mechanism for transmitting the read identification data by the mobile station's radio transmitter over the radio path via the base station further to the data processing device.

8 Claims, 2 Drawing Sheets

IDENTIFYING AN OBJECT

Figure 1:
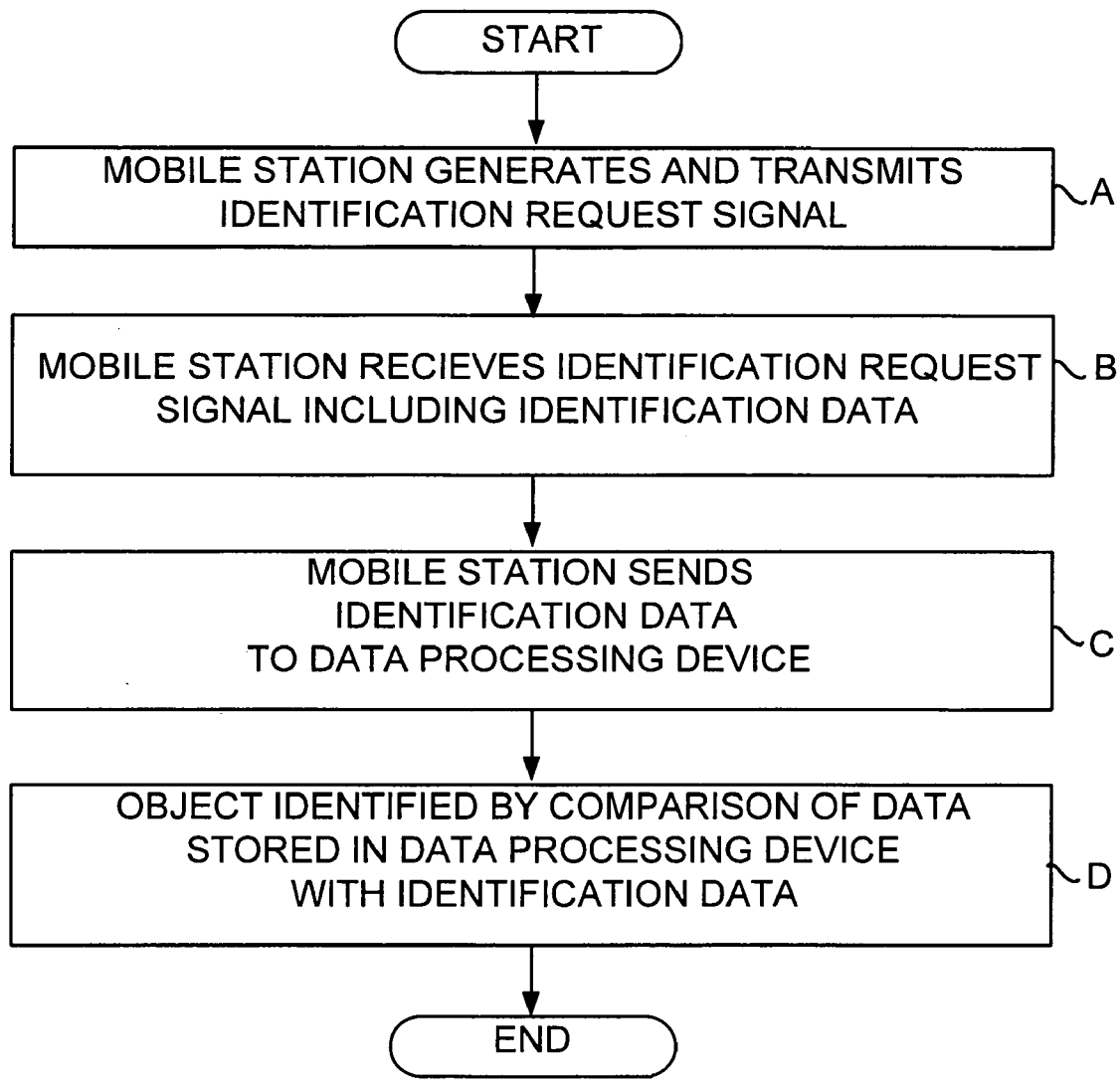

This is the U.S. National Stage of PCT/FI00/00583, filed Jun. 28, 2000, which was filed in the English language.

The present invention relates to identifying an object by means of an identification means arranged in the object.

In previously known solutions, objects, i.e. for example components processed in a factory warehouse or on a production line, are provided with identification means, which allow mechanical identification of said objects. Examples of such known identification means are bar code labels and tags. To identify an object, identification data is read from its identification means, allowing the object to be identified.

In known solutions, tailor-made hardware is used for the identification of objects. Consequently, for example a person working by a production line in a factory has at his disposal a reading device, such as a bar code reader or a device for reading identification data from a tag. In cases when the identification data read from the identification means has to be transmitted to, for example, a data processing device in which inventory accounting or the like is maintained, the reading device is usually connected to a communication device by means of which the identification data can be transmitted further to the data processing device.

A known reading device of the type described above has, however, the disadvantage that the device used has to be tailor-made for reading the identification means. If, in addition, the identification data has to be transmitted to a data processing device, this means that two different devices have to be matched up in order to provide a working reading device. In practice, matching up two different devices often requires changes to both devices in order for them to co-operate. In addition, a reading device composed of separate, interconnected devices is usually large, complicated to use and relatively expensive.

It is an object of the present invention to solve the above problem and to provide a solution for facilitating the identification of an object comprising an identification means, and enabling a more flexible and inexpensive way to accomplish a reading device. This object is achieved by the method of the invention of identifying an object comprising an identification means. The method of the invention is characterized by reading the object's identification data from the identification means by a mobile station, and identifying said object on the basis of the identification data read by the mobile station.

The invention also relates to a system in which the method of the invention can be utilized. The system of the invention comprises: a mobile switching centre, a base station communicating with the mobile switching centre, a mobile station comprising a radio transmitter and a radio receiver for setting up a connection to the mobile switching centre via the base station, an object comprising an identification means, and a data processing device in which data relating to said object is maintained. The system of the invention is characterized in that said mobile station comprises: means for reading the object's identification data from the identification means, and means for transmitting the read identification data by the mobile station's radio transmitter over the radio path via the base station further to said data processing device.

The invention further relates to a mobile station, which can be utilized in the system of the invention. The mobile station of the invention comprises a user interface, a radio transmitter and a radio receiver for setting up a connection to a base station in a mobile communication system via radio signals. The mobile station of the invention is characterized by comprising means for reading identification data from the object's identification means in response to measures taken by the mobile station's user via the user interface, and means for transmitting the read identification data to said base station by said radio transmitter.

The invention is based on utilizing a conventional mobile station of a mobile communication system for reading identification data from the identification means. This eliminates the need to make a special reading device solely for reading the identification data. If the read identification data has to be transmitted to a special data processing device, the mobile station is able to attend to this when reading the identification data, for example by transmitting the identification data as a short message via a mobile communication network to the data processing device.

The most significant advantage of the solution of the invention is that there is no need for a special reading device for reading the identification data. Consequently, the device used for reading the data, i.e. a mobile station, is notably more inexpensive than in known solutions, in which said device has to be specially tailor-made for said purpose. In addition, the reading device, i.e. the mobile station, can be made distinctly smaller than known reading device/radio transmitter combinations. This facilitates the use and handling of the device used for reading the identification data. Owing to its small size, the device used for reading the data is also suitable for use as a conventional mobile station.

In a preferred embodiment of the invention, the identification means is composed of a bar code. In this case, a bar code reader can be integrated into the mobile station and used for reading the data from the object's identification means.

In a second preferred embodiment of the invention, the identification means can be composed of a tag. This allows the radio transmitter of the mobile station to be utilized for transmitting a predetermined identification request signal. In this case, in response to the identification request signal, the tag generates an identification signal, which the mobile station receives either with its radio receiver or, alternatively, with an infrared receiver. Since mobile stations comprising not only a radio transmitter and a radio receiver, but also an infrared receiver, are already in use, this embodiment of the invention also renders it unnecessary to make any structural changes to the mobile station. It is also feasible to achieve the changes necessary for applying the invention simply by changing the mobile station's software.

As identification means can be used a tag capable of recovering operational energy from the RF field surrounding it. Consequently, the tag can be a passive tag that obtains the necessary operational energy from the RF field of the identification request signal transmitted by the mobile station. However, the tag is preferably so programmed that it generates an identification signal only when it has received the right identification request signal. In other words, the identification request signal preferably includes a certain code whose identification makes the tag generate the identification signal. This prevents a radio signal generated for example by a base station in a mobile communication system from inducing the transmission of an identification signal, even though said radio signal is at the tag's toggle frequency.

In order for the identification request signal transmitted by the mobile station via the radio transmitter not to interfere with other parts of the mobile communication system, the mobile communication system preferably comprises control means for producing an authorization signal. In this case, said authorization signal indicates to the mobile station the point of time allowed for the transmission of an identification request signal. In a digital time division mobile communication system for example, a given timeslot can be reserved for the transmission of the identification request signal, and the mobile communication system forwards information on this timeslot in an authorization signal to be transmitted on its control channel.

In a third preferred embodiment of the invention, an infrared transmitter for transmitting the identification request signal can be arranged in the mobile station. In this case, the identification means can be composed of a tag comprising a battery and an infrared receiver, for example. Consequently, the tag is able to generate the identification signal in response to an identification request signal by the operational energy obtained from the battery. The tag can generate the identification signal with, for example, infrared signals or radio signals.

The preferred embodiments of the method, system and mobile station of the invention are disclosed in the attached dependent claims 2 to 7, 9 to 15, and 17 to 20.

Figure 2:
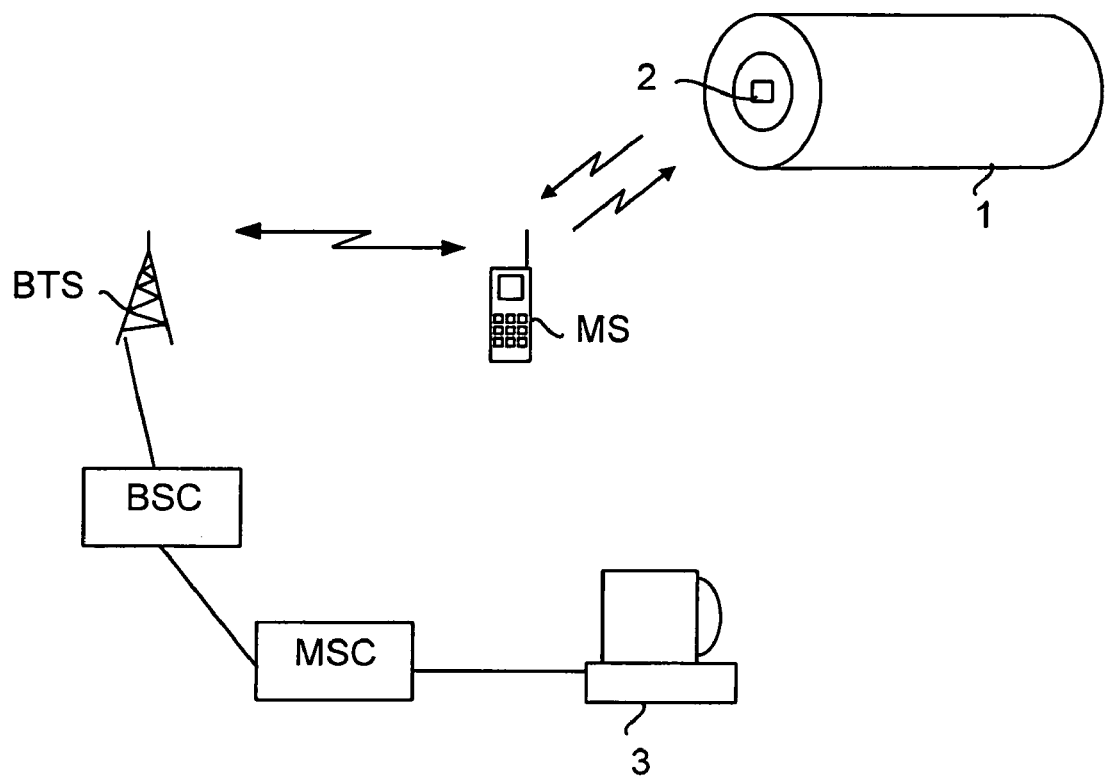
Figure 3:
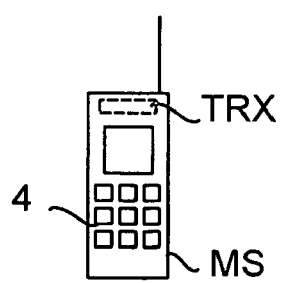
Figure 4:
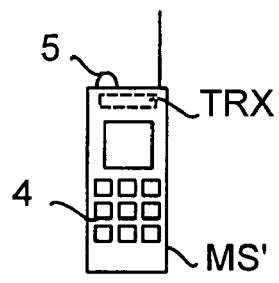
Figure 5:
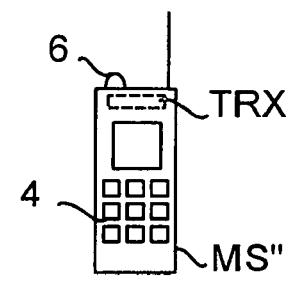

In the following, the invention will be described in greater detail by way of example, with reference to the attached figures, of which FIG. 1 is a flow chart of a first preferred embodiment of the method of the invention, FIG. 2 is a block diagram of a first preferred embodiment of the system of the invention, FIG. 3 illustrates a first preferred embodiment of the mobile station of the invention, FIG. 4 illustrates a second preferred embodiment of the mobile station of the invention, and FIG. 5 illustrates a third preferred embodiment of the mobile station of the invention.

FIG. 1 is a flow chart of a first preferred embodiment of the method of the invention.

In block A in FIG. 1, a mobile station generates and transmits a predetermined identification signal. Said identification signal can be transmitted for example with the radio transmitter of the mobile station or, alternatively, with the infrared transmitter of the mobile station. The type of identification means arranged in the object to be identified is naturally decisive.

In block B, the mobile station receives the identification signal including identification data. The identification signal can be received with the radio receiver of the mobile station if the identification means used is for example a tag generating an RF frequency identification signal. If again the identification means generates an identification signal composed of an infrared signal, it can be received with the infrared receiver of the mobile station.

In block C, the identification data received is transmitted with the radio transmitter of the mobile station further to a data processing device, in which data on objects to be identified and their identification data is maintained. The identification data can be transmitted for example in a short message or another corresponding text message via the mobile communication system to the data processing device.

In block D, the object, whose identification data was read, is identified. For this purpose, a list of all objects to be identified is stored in the data processing device, and the list contains the identification data of each object.

FIG. 2 is a block diagram of a first preferred embodiment of the system of the invention. In the case of FIG. 2, the assumption is, by way of example, that the object to be identified is composed of a paper roll 1, to which an identification means 2 is fastened.

The system of FIG. 2 comprises a data processing device 3 for maintaining data relating to the objects to be identified. If the objects to be identified are assumed to be for example paper rolls, then the following can be stored in the data processing device 3 for each paper roll: identification data, i.e. an identifier to be read from the identification means attached to the paper roll, the weight of the paper roll, and the buyer/receiver of the paper roll. Consequently, for example the weight of the paper roll can be determined by means of the identification data of the paper roll.

In the case of FIG. 2, the identification data on the paper roll is read with a mobile station MS from the identification means 2 attached to the paper roll. Once the identification data is read to the mobile station MS, the mobile station MS transmits it further via its radio transmitter to a base station BTS. From the base station, the identification data is forwarded by a mobile communication network further via a base station controller BSC and a mobile switching centre MSC to the data processing device 3. If the identification data is transmitted in a short message, a short message service centre (not shown in the figure) in the mobile communication system also participates in the data transmission.

Once the data processing device 3 has received the identification data, it retrieves from its memory the data on the object to be identified. The data processing device may have been programmed to return the data on the identified object to for example the mobile station MS in a short message transmitted via the mobile communication system. Such an embodiment allows the user of the mobile station to receive on the display of his mobile station MS for example the name of the receiver of the paper roll 1, once he has first read the identification data on the paper roll 1 from the identification means 2 with the mobile station.

The identification data on the paper roll 1 can be read from the identification means in several alternative ways depending on the type of identification means 2 that is attached to the paper roll. Reading the data is described in greater detail for FIGS. 3 to 5.

FIG. 3 illustrates a first preferred embodiment of the mobile station of the invention. The mobile station MS shown in FIG. 3 is a conventional mobile telephone comprising a combined radio transmitter/radio receiver unit TRX that the mobile station uses to set up a connection to the other parts of the mobile communication system.

The mobile station MS of FIG. 3 can be utilized in the system of the invention for example when the identification means 2 is a passive tag, known per se. A passive tag absorbs energy from the surrounding RF field. The tag uses the absorbed energy to generate an RF field at another frequency.

In accordance with the invention, in response to measures (e.g. pushing a certain button) taken by the mobile station's user via a user interface, the mobile station MS transmits with its radio transmitter TRX an identification request signal at a given frequency. In this case the identification signal includes a given code, to the recognition of which the tag reacts by transmitting an RF frequency identification signal including the identification data stored in the tag. The mobile station receives via its radio receiver said identification signal, via which the identification data in the identification means can be read in the mobile station MS.

Tags operating for example in the range of about 900 MHz are commercially available. This means that a mobile station of the GSM system, for example, can read the contents of such tags, provided that the mobile station is programmed to operate at the toggle frequency of that particular tag. A tag usually employs two toggle frequencies, the first of which is used to invoke the tag, i.e. a given signal at said frequency makes the tag transmit the data stored in its memory at the second toggle frequency. This way a mobile station capable of duplex type of communication can be so programmed that the transmission frequency of the mobile station corresponds to the first toggle frequency of the tag, and the reception frequency of the mobile station corresponds to the second toggle frequency of the tag. Such commercially available tags may comprise for example a 64-bit memory, in which the identification data can be stored so that they can be read from the memory by means of a mobile station MS.

In order for the reading of data by means of a mobile station's MS radio transmitter and radio receiver not to interfere with the operation of the other parts of a mobile communication network, the mobile station MS can be programmed to transmit the identification request message on a given frequency channel, which is reserved in the mobile communication system for reading identification data. Alternatively, the mobile station can transmit the identification data at a given predetermined point of time, which allows the utilization of a frequency channel that is also used for other purposes. This may be accomplished for example by the mobile station MS first sending a predetermined inquiry signal via the base station BTS of FIG. 2 to the base station controller BSC, when the mobile station's MS user activates the reading of the identification data via the user interface 4. The base station controller BSC then checks the point of time allowed for reading the data without other network parts being disturbed. The base station controller indicates said point of time to the mobile station MS by a special authorization signal that the base station controller transmits to the mobile station MS via the base station BTS. Consequently, the transmitter TRX of the mobile station transmits the identification request signal at the point of time indicated by the authorization signal.

If the data has to be read from the identification means on a frequency channel that is used by the mobile communication system, the mobile station can be programmed to use a low power level during the reading. In many cases the mobile station can be brought very near the identification means before the mobile station transmits the identification request signal. Consequently, an identification request signal transmitted on a low power level is sufficient for reading the data of the identification means comprised of for example a tag. In addition, the duration in time of the identification request signal may be short. An identification signal having a low power level and/or a short duration in time brings about the advantage that the interference caused to other system parts is minimized.

When the invention is applied in a time division mobile telephone system, the base station controller BSC of FIG. 2 can allocate a given timeslot from the base station BTS for reading the identification data. In this case the base station BTS transmits on its control channel, along with other data relating to the radio cell it maintains, a special authorization signal that indicates the timeslot allowed for reading the identification data. When the user of the mobile station MS of FIG. 3 uses the user interface 4 to activate the reading of the identification data, the mobile station waits until it receives an authorization signal on the control channel. The transmitter TRX of the mobile station MS then waits until it is the turn of the timeslot indicated by the authorization signal to transmit, and then transmits the identification request signal.

In accordance with the invention, the mobile station of FIG. 3 can also be utilized for changing the data stored in the tag. In this case the transmitter of the mobile station transmits a predetermined signal, which the tag identifies, and which indicates to the tag that it must store in the memory the data transmitted from the mobile station. For example identification data can thus be stored in the tag in such a way that the user of the mobile station uses a keyboard to write the identification data that is to be stored in the tag.

FIG. 4 illustrates a second preferred embodiment of the mobile station of the invention. In FIG. 4, the mobile station MS' largely corresponds to the mobile station of FIG. 3, but in the case of FIG. 4, the mobile station MS reads the identification data by means of an infrared transmitter 5 and an infrared receiver 5.

Accordingly, the mobile station of FIG. 4 is utilized with a tag that comprises means for receiving an identification request signal composed of an infrared signal, and for sending an identification signal composed of infrared signals. The use of infrared signals provides the advantages that the reading of identification data does not cause unnecessary interference to other parts of a mobile communication system.

Unlike in FIG. 4, the mobile station may also be programmed to transmit the identification request signal by its radio transmitter TRX, and then receive the identification signal via the infrared receiver 5. In this case the mobile station can be utilized with a tag that is able to absorb the energy required for its operation from the identification request signal transmitted by the radio transmitter of the mobile station, and then use the absorbed energy and the infrared transmitter to transmit the identification signal composed of infrared signals.

FIG. 5 illustrates a third preferred embodiment of the mobile station of the invention. In the embodiment of FIG. 5, the mobile station MS" is provided with a bar code reader 6. In other words, said embodiment is suitable for use when the identification means is composed of a bar code label. In this case the mobile station reads the identification data comprised by the bar code via the bar code reader 6, once the user of the mobile station MS" activates the reading of the data via the user interface.

It is to be understood that the above description and the related figures are only intended to illustrate the present invention. Different variations and modifications of the invention will be apparent to a person skilled in the art without deviating from the scope and spirit of the invention set forth in the attached claims.

What is claimed is:

1. A method of identifying an object having an identification means, comprising generating and transmitting an authorization signal indicating the timeslot or timeslots allowed for the transmission of an identification request signal, receiving at a mobile station of a time division mobile communication system, in which the frequency channels used by the system are divided into timeslots, the authorization signal indicating the timeslot or timeslots allowed for transmission of the identification request signal, reading the object's identification data from the identification means by transmitting said identification request signal by the mobile station's radio transmitter to said identification means in the timeslot indicated by said authorization signal, and receiving an identification signal by the mobile station's radio receiver or by the mobile station's infrared receiver from said identification means, and identifying said object on the basis of the identification data included in the identification signal.

2. A method as claimed in claim 1, further comprising transmitting the identification data read by the mobile station with the mobile station's radio transmitter via a base station in a mobile communication system to a data processing device in which data relating to said object is stored, and identifying said object by comparing the data stored in the data processing device with said identification data.

3. A time division mobile communication system, in which the frequency channels used by the system are divided into timeslots, said system comprising a mobile switching centre, a base station communicating with the mobile switching centre;

an object comprising an identification means composed of a tag comprising means for generating an identification signal including identification data in response to a predetermined identification request signal, a data processing device in which data relating to said object is maintained, control means for generating and transmitting an authorization signal indicating a timeslot or timeslots allowed for transmitting an identification request signal, and a mobile station comprising:

a radio transmitter and a radio receiver for setting up a connection to the mobile switching centre via the base station, means for receiving the authorization signal, means for reading said object's identification data from the identification means:

by transmitting an identification request signal with the mobile stations radio transmitter to said identification means in the timeslot indicated by the authorization signal, and by receiving from said identification means the identification data included in an identification signal with the mobile stations radio receiver or with an infrared receiver, and means for transmitting the read identification data with the mobile station's radio transmitter over the radio path via the base station further to said data processing device.

4. A system as claimed in claim 3, wherein said tag is a passive tag comprising means for recovering energy from said identification request signal and means for generating said identification signal with said recovered energy.

5. A system as claimed in claim 3, wherein said tag comprises means for generating an RF frequency identification signal.

6. A system as claimed in claim 3, wherein said tag comprises means for generating an identification signal composed of an infrared signal.

7. A system as claimed in claim 3, wherein said control means are arranged to generate and transmit said authorization signal in response to an inquiry signal received by the control means, and said mobile station comprises means for transmitting the inquiry signal to said control means.

8. A mobile station of a time division mobile communication system, in which the frequency channels used by the system are divided into timeslots comprising a user interface, a radio transmitter and a radio receiver for setting up a connection to a base station in a mobile communication system via radio signals, means for receiving an authorization signal, indicating a timeslot or timeslots allowed for transmitting an identification request signal, transmitted by the base station over the radio path, means which, in response to measures carried out by the mobile station's user via the user interface, read identification data from an object's identification means, said means for reading the identification data are composed of the mobile station's radio transmitter, which in the timeslot indicated by the authorization signal transmits a predetermined identification request signal to said identification means, an of the mobile station's radio receiver or of an infrared receiver, which receives an identification signal comprising the identification data from said identification means, and the mobile station comprises means for transmitting the read identification data with said radio transmitter to said base station.

* * * * *